United States Patent [19]

Lin

[11] Patent Number: 5,046,176
[45] Date of Patent: Sep. 3, 1991

[54] CLOSED-LOOP CLUTCH CONTROL OF AN AUTOMATIC SHIFT TRANSMISSION

[75] Inventor: William C. Lin, Troy, Mich.

[73] Assignee: General Motors Corporation, Detroit, Mich.

[21] Appl. No.: 481,541

[22] Filed: Feb. 20, 1990

[51] Int. Cl.⁵ .......................................... B60K 41/78
[52] U.S. Cl. ................................... 364/424.1; 74/866
[58] Field of Search ................ 364/424.1; 74/866, 867

[56] References Cited

U.S. PATENT DOCUMENTS

| | | | |
|---|---|---|---|
| 3,754,482 | 8/1973 | Sanders et al. | 475/120 |
| 4,724,723 | 2/1988 | Lockhart et al. | 74/854 |
| 4,821,190 | 4/1989 | Patil | 364/424.1 |
| 4,893,527 | 1/1990 | Furusawa et al. | 74/866 |
| 4,942,530 | 7/1990 | Boda et al. | 364/424.1 |
| 4,953,090 | 8/1990 | Narita | 364/424.1 |

Primary Examiner—Salvatore Cangialosi
Attorney, Agent, or Firm—Mark A. Navarre

[57] ABSTRACT

An improved closed-loop transmission shift control in which the pressures are regulated in a manner to accelerate/decelerate the input and output shafts or the transmission in relation the progression of the shift. The control requires dynamic knowledge of the transmission input and output torques, and the preferred mechanization of the present invention employs an estimation of the input and output torque effects so that the control is carried out with only input and output shaft speed measurements. The estimations are adjusted based on the difference between the expected and actual input and output shaft speed values, so as to compensate for torque control errors as well as torque estimation errors.

6 Claims, 3 Drawing Sheets

CLOSED-LOOP CLUTCH CONTROL OF AN AUTOMATIC SHIFT TRANSMISSION

This invention is directed to a closed-loop automatic shift transmission clutch control in which the clutch pressures are controlled to achieve a desired acceleration during the shift.

BACKGROUND OF THE INVENTION

Transmission clutch controls can generally be characterized as either open-loop or closed-loop. In open-loop controls, the clutch pressures during shifting are carried out according to a predefined schedule as a function of time and some other powertrain parameter, such as engine throttle or an estimate of the transmission input torque; see, for example, the U.S. Pat. No. to Downs et al. 4,653,350, issued March 31, 1987, and assigned to the assignee of the present invention. In closed-loop controls, the clutch pressures during shifting are developed in relation to the error or difference between desired and actual values of a transmission parameter, such as input speed, input acceleration or output torque; see, for example, the U.S. Pat. Nos. to Sanders et al. 3,754,482, issued Aug. 28, 1973, and Lockhart et al. 4,724,723, issued Feb. 16, 1988, both of which are assigned to the assignee of the present invention.

SUMMARY OF THE PRESENT INVENTION

The present invention is directed to an improved closed-loop transmission shift control in which the clutch pressures are regulated in a manner to accelerate/decelerate the input and output shafts of the transmission in relation the progression of the shift. The control requires dynamic knowledge of the transmission input and output torques, but the present invention employs an estimation of the input and output torque effects so that the control is carried out with only input and output shaft speed measurements. The estimations are adjusted based on the difference between expected and measured input and output shaft speed values, so as to compensate for clutch torque control errors as well as torque estimation errors.

DETAILED DESCRIPTION OF THE INVENTION

Figure 1:
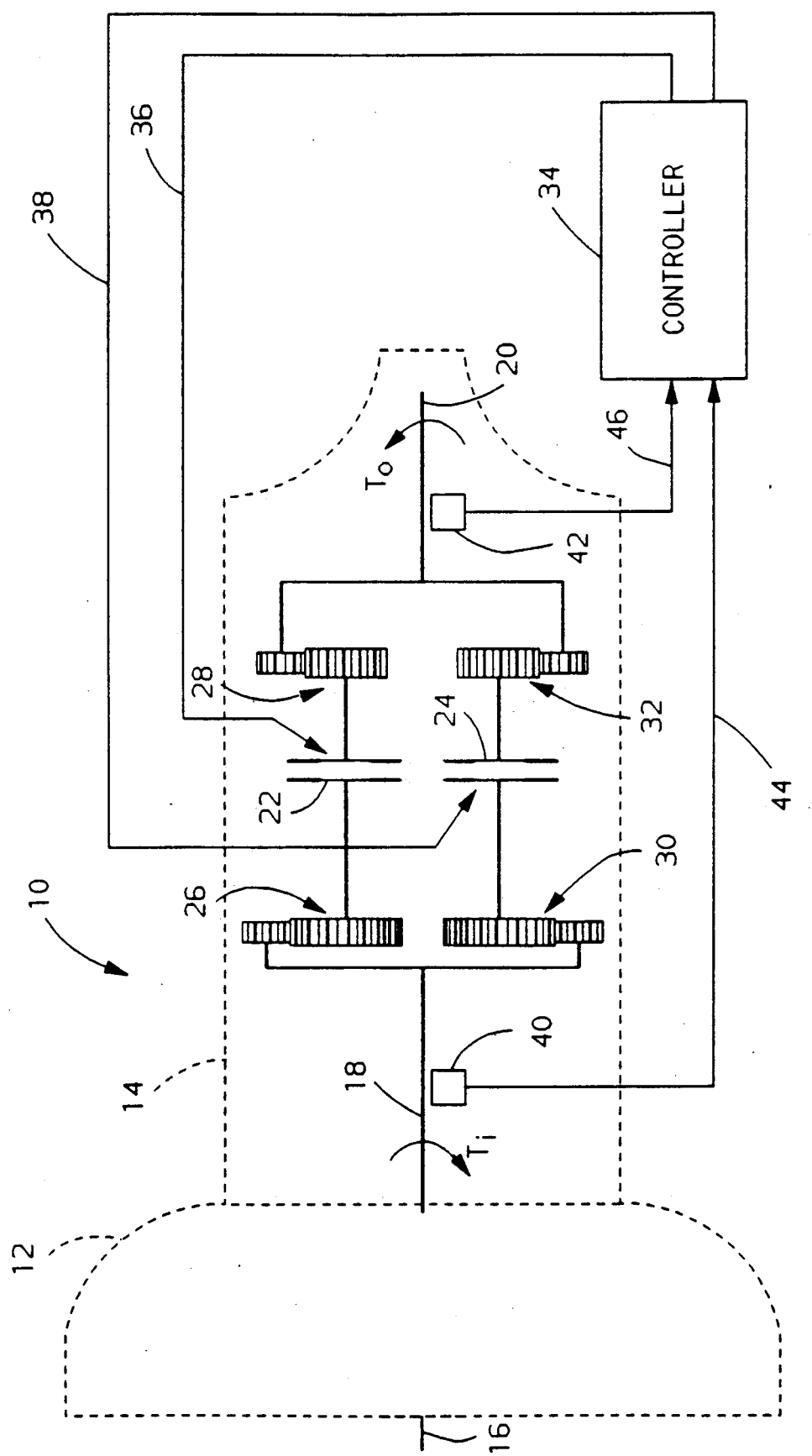
FIG. 1 is a schematic diagram of a transmission and computer-based controller for carrying out the control of this invention.

Referring to FIG. 1, the reference numeral 10 generally designates a motor vehicle automatic transmission comprising a fluidic coupling 12 and mechanical gearset 14. The input shaft 16 of fluid coupling 12 is adapted to be driven by the vehicle engine (not shown), and the gearset input shaft 18 is adapted to be driven by the output of the fluid coupling 12. The gearset output shaft 20, in turn, is adapted to drive a pair of vehicle wheels (not shown).

The gearset 14 includes a pair of torque establishing devices (clutches) 22 and 24 engageable to define a drive between the input and output shafts 18, 20 through the gear element pairs generally designated by the reference numerals 26-32. In nonshifting or steady state operation, one or the other of clutches 22 and 24 is engaged. When clutch 22 is engaged and clutch 24 disengaged, the drive is through gear element pairs 26 and 28, and speed ratio between shafts 18 and 20 is given by the product $(g_{26} * g_{28})$, where $g_{26}$ and $g_{28}$ are the ratios provided by the gear element pairs 26 and 28, respectively. When clutch 24 is engaged and clutch 22 disengaged, the drive is through gear element pairs 30 and 32, and speed ratio between shafts 18 and 20 is given by the product $(g_{30} * g_{32})$, where $g_{30}$ and $g_{32}$ are the ratios provided by the gear element pairs 30 and 32, respectively.

In shifting operation, the previously engaged (off-going) clutch is progressively disengaged or released while the previously disengaged (on-coming) clutch is progressively engaged (applied). During the shift, the dynamics of the input and output shafts 18 and 20 are a function of the input and output shaft torques $T_i$ and $T_o$, the torques $T_{22}$ and $T_{24}$ transmitted by clutches 22 and 24, ratios $g_{26}$, $g_{28}$, $g_{30}$ and $g_{32}$ provided by the gear element pairs 26, 28, 30 and 32, as set forth in the characteristic expressions:

$$J_i A_i = T_i - T_{22}/g_{26} - T_{24}/g_{30} - T_o/(g_{26} * g_{28} + g_{30} * g_{32}) \quad (1)$$

and $$J_o A_o = -T_o - T_{22}/g_{28} - T_{24}/g_{32} + T_i(g_{26} * g_{28} + g_{30} * g_{32}) \quad (2)$$

where $J_i$ and $A_i$ represent the inertia and acceleration of input shaft 18, and $J_o$ and $A_o$ represent the inertia and acceleration of output shaft 20.

The engagement pressure or torque capacity of each of the clutches 22 and 24 is controlled by a computer-based controller 34, as indicated by the lines 36 and 38. The clutches may be conventional friction or electro-magnetic devices, by way of example, so long as their torque producing characteristic is known. In a fluid-operated friction device, for example, the torque capacity is directly related to the fluid pressure supplied to the clutch apply chamber, once such chamber is filled. The speed inputs required for carrying out the clutch control are obtained from conventional speed transducers 40 and 42 responsive to the rotary speeds $W_i$ and $W_o$ of input and output shafts 18 and 20, respectively, such speed inputs being supplied to the controller 34 via lines 44 and 46.

The function of the controller 34 is to determine torque commands for the clutches 22 and 24 which will provide desired input and output accelerations $A_i$, $A_o$ during shifting operation. In the illustrated embodiment, the objective is to control both acceleration parameters to be proportional to the respective speed errors. In other words, the desired input shaft acceleration $A_i(des)$ at an point in the shift is proportional to the difference between the measured input shaft speed on line 44 and its target or post-shift speed. Similarly, the desired output shaft acceleration $A_o(des)$ at any point in the shift is proportional to the difference between the measured output shaft speed on line 46 and its target or post-shift speed. Algebraically, this may be expressed as $$A_i(des) = K1(W_{itar} - W_i), \text{ and} \quad (3)$$

$$A_o(des) = K2(W_{otar} - W_o) \quad (4)$$

where K1 and K2 are gain constants, and $W_{itar}$ and $W_{otar}$ are post-shift input and output speed target values.

With knowledge of the input and output shaft torques $T_i$ and $T_o$, the clutch torques required to carry out the above-described objective may be computed by solving for $T_{22}$ and $T_{24}$ in the characteristic transmission equations (1) and (2). For a number of reasons, however, the input and output torques $T_i$ and $T_o$ are ordinarily not measured by on-board motor vehicle powertrain controls. Accordingly, this invention is primarily directed to a control method for determining the required clutch torques $T_{22}$ and $T_{24}$ using only the measured input and output speeds $W_i$ and $W_o$. According to the control method, and as described below, the measured speeds and previous control conditions are used to estimate the combined effect of variations in the input and output shaft torques $T_i$ and $T_o$. Using the estimated torque effects and the desired input and output acceleration values defined in equations (3) and (4), the clutch torque commands $T_{22}$ and $T_{24}$ are repeatedly computed during shifting operation from equations (1) and (2).

Rearranging equations (1) and (2) to solve for the input and output acceleration terms $A_i$ and $A_o$, and using the terms e1-e4 and d1-d4 to consolidate gear ratio and inertia constants yields:

$$A_i = -e_1 T_{22} - e_2 T_{24} + d_1 T_i - d_2 T_o, \text{ and} \quad (5)$$

$$A_o = -e_3 T_{22} - e_4 T_{24} + d_3 T_i - d_4 T_o \quad (6)$$

In the above expressions, $$e_1 = 1/g_{26}J_i \quad e_2 = 1/g_{30}J_i$$
$$e_3 = g_{28}/J_o \quad e_4 = g_{32}/J_o$$
$$d_1 = 1/J_i \quad d_2 = 1/J_i(g_{26}{}^*g_{28} + g_{30}{}^*g_{32})$$
$$d_4 = 1/J_o \quad d_3 = 1/J_o(g_{26}{}^*g_{28} + g_{30}{}^*g_{32})$$

According to this invention, the torque related terms in equations (5) and (6) are combined and estimated to facilitate a computation of the clutch torque terms $T_{22}$ and $T_{24}$. In equation (5), the combined torque term, designated $V_i$, is given by:

$$V_i = d_1 T_i - d_2 T_o \quad (7)$$

In equation (6), the combined torque term, designated $V_o$, is given by:

$$V_o = d_3 T_i - d_4 T_o \quad (8)$$

A suitable substitution into equations (5) and (6) yields:

$$A_i = -e_1 T_{22} - e_2 T_{24} + V_o \quad (9)$$

and $$A_o = -e_3 T_{22} - e_4 T_{24} + V_o \quad (10)$$

These terms describe the contribution of the input and output shaft torques $T_i$ and $T_o$ to the shifting dynamics, and may be thought of as a disturbance, using control system terminology.

The estimation of the torque terms $V_i$ and $V_o$ involves a periodic estimation of the change in speed and torque effects occurring during the shift, and an updating of the torque terms in accordance with the estimated changes. Prior to the initiation of a shift, the desired acceleration values $A_i$ and $A_o$ are zero, and the initial values of the terms $V_i$ and $V_o$ are given by equations (9) and (10). In a shift involving the disengagement of clutch 22 and the engagement of clutch 24, for example, the initial values $V_i(0)$ and $V_o(0)$ are as follows:

$$V_i(0) = e_1 {}^* T_{22}(\text{max}) \quad (11)$$

and $$V_o(0) = e_3 {}^* T_{22}(\text{max}) \quad (12)$$

where $T_{22}(\text{max})$ is the maximum torque level that clutch 22 can develop.

Initially, the torque terms $V_i$ and $V_o$ are estimated as described above in reference to equations (11) and (12). These estimates are used to generate clutch torque commands $T_{22}$ and $T_{24}$ using the expressions:

$$T_{22} = \frac{e_4[V_i - A_i(\text{des})] - e_2[V_o - A_o(\text{des})]}{e_1 e_4 - e_2 e_3} \quad (13)$$

$$T_{24} = \frac{e_1[V_o - A_o(\text{des})] - e_3[V_i - A_i(\text{des})]}{e_1 e_4 - e_2 e_3} \quad (14)$$

which are essentially a rearrangement of equations (9) and (10). The required torque values $T_{22}$ and $T_{24}$ are used to determine the required clutch control, based on the stored clutch gain characteristics. For a fluid operated friction clutch, for example, a torque capacity vs. pressure gain constant is stored for each clutch, and used to convert the torque command into a pressure command. If the clutch pressure is pulse width modulated (PWM) from the transmission line pressure, for example, the pressure command is converted, in turn, to a PWM duty cycle.

The clutch torque commands, in turn, are used to compute future shaft speeds $W_{ip}$ and $W_{op}$. The future shaft speeds $W_{ip}$ and $W_{op}$ can be computed according to the expressions:

$$W_{ip} = W_{ip}(\text{last}) + W_{ip}(\text{delta}), \text{ and} \quad (15)$$

$$W_{op} = W_{op}(\text{last}) + W_{op}(\text{delta}) \quad (16)$$

The terms $W_{ip}(\text{delta})$ and $W_{op}(\text{delta})$ are the incremental changes in input and output shaft velocities $W_i$, $W_o$ in the program loop interval DT, and are defined according to this invention by the expressions:

$$W_{ip}(\text{delta}) = [F(W_{ip}(\text{last}) - W_i) - e_1 T_{22} - e_2 T_{24} + V_i]\text{DT} \quad (17)$$

$$W_{op}(\text{delta}) = [F^*(W_{op}(\text{last}) - W_o) - e_3 T_{22} - e_4 T_{24} + V_o]\text{DT} \quad (18)$$

where the term F is a negative gain term. These expressions are based on equations (9) and (10), and include an error term amounting to a predetermined fraction of the difference between the predicted and current speed values for input shaft 18, or $$F(W_{ip}(\text{last}) - W_i) \quad (19)$$

Initially, of course, the term $W_{ip}(\text{last})$ is set equal to the measured input shaft speed $W_i$ so that the error term of equation (19) is zero.

In the second time interval DT, the current speed measurements $W_i$ and $W_o$ are compared with the predicted speed values from the first time interval, now designated as $W_{ip}(\text{last})$ and $W_{op}(\text{last})$, to judge the accuracy of the initial torque term estimates. The differences

[$W_{ip}$(last) − $W_i$] and [$W_{op}$(last) − $W_o$], referred to as $V_i$(delta) and $V_o$(delta) in the flow diagrams, are then used to update/correct the torque terms $V_i$ and $V_o$ in accordance with the expressions:

$$V_i = V_i(\text{last}) + C[W_{ip}(\text{last}) - W_i]DT, \text{ and} \quad (20)$$

$$V_o = V_o(\text{last}) + C[W_{op}(\text{last}) - W_o]DT. \quad (21)$$

Having updated the values of the torque terms $V_i$ and $V_o$, the required clutch torques $T_{22}$ and $T_{24}$ are recomputed using equations (13) and (14). The torque commands, in turn, are used to update the future shaft speeds $W_{ip}$ and $W_{op}$ according to equations (15)–(18) as in the first time interval described above.

In the third and succeeding time intervals, the torque terms are corrected as described above in reference to equations (20) and (21), the clutch torque commands are computed as described above in reference to equations (13) and (14), and the speed projections $W_{ip}$ and $W_{op}$ are updated as described above in reference to equations (15)–(18).

When the estimated values of torque terms $V_i$ and $V_o$ match the actual values, the predicted and measured shaft speeds will also match, and the shafts 18 and 20 will accelerate at the desired values $A_i$ and $A_o$, provided that the clutches 22 and 24 are controlled to produce the commanded torques. In practice, however, there are variations in the clutch torque control (which may be actuator or clutch related) which cause the predicted shaft speeds to differ from the measured shaft speeds. When estimation errors or clutch torque control errors occur, the terms [$W_{ip}$(last) − $W_i$] and/or [$W_{op}$(last) − $W_o$] therefore become nonzero. This produces a compensating correction in the torque terms $V_i$ and/or $V_o$ according to equations (20) and (21), producing a corresponding change in the clutch torque commands according to equations (13) and (14). The new projected speed values $W_{ip}$ and $W_{op}$ are also adjusted according to equations (15)–(18).

For example, in an upshift where the torque actually produced at on-coming clutch 22 is less than the commanded value, the actual deceleration of input shaft 18 (as computed using equation (9)) will initially be less than the value [$W_{ip}$(delta)/DT] predicted in equation (13). As a result, a negative speed difference [$W_{ip}$(last) − $W_i$] will be observed. Since the gain term C is negative, the torque term $V_i$ will be increased according to equation (20), even though the torque estimation per se is accurate. This, in turn, produces an increase in the on-coming clutch torque command $T_{22}$ according to equation (13), thereby compensating for the clutch torque control error in a closed-loop manner. Similar corrections occur to compensate for discrepancies between the estimated and actual values of the torque terms $V_i$ and $V_o$.

While the selection of the gain terms C and F varies with the transmission geometry and shift dynamics, we have found that the best shift quality is achieved with $C = -(F^2/4)$. Various other relationships may be selected to best satisfy a particular transmission performance requirement, trading off shift duration for higher torque transients at the output shaft 20.

Figure 2:
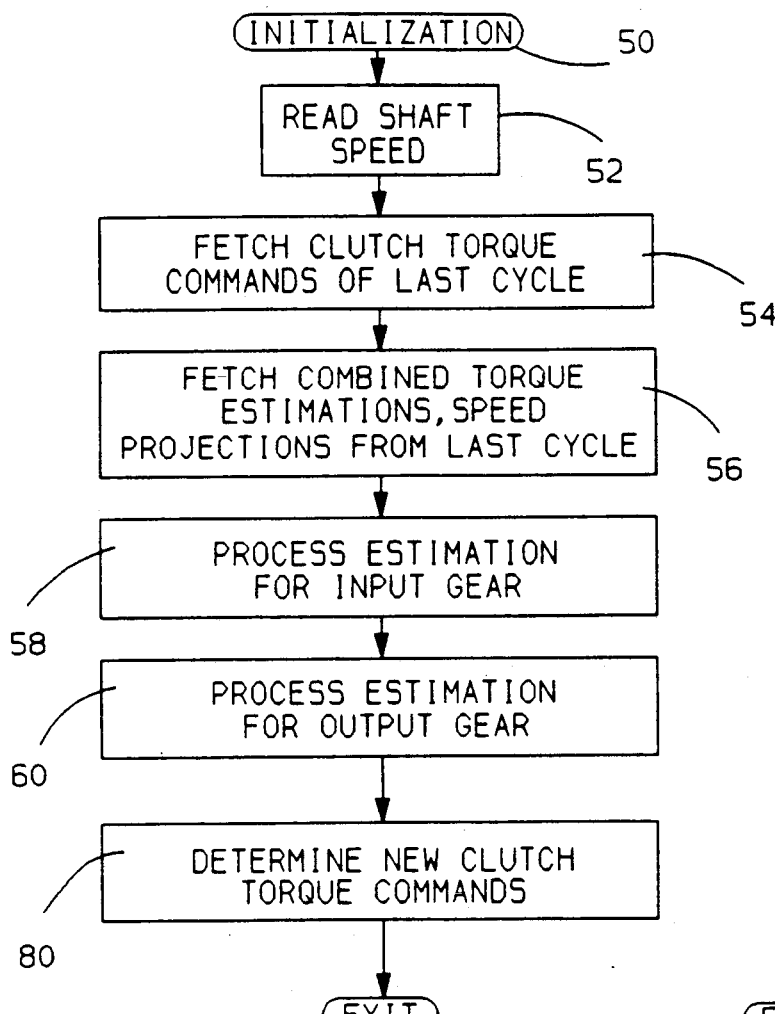
FIGS. 2-5 are flow diagrams representative of computer program instructions executed by the controller of FIG. 1 in carrying out the control of this invention.
Figure 3:
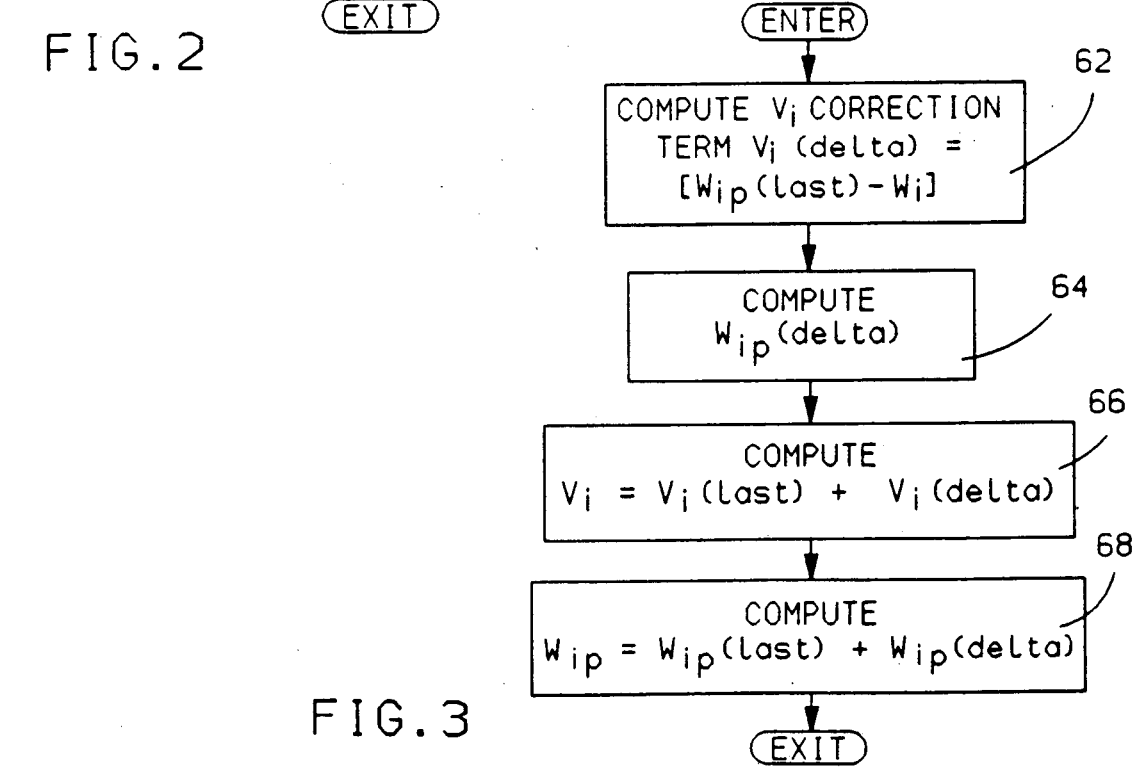
Figure 4:
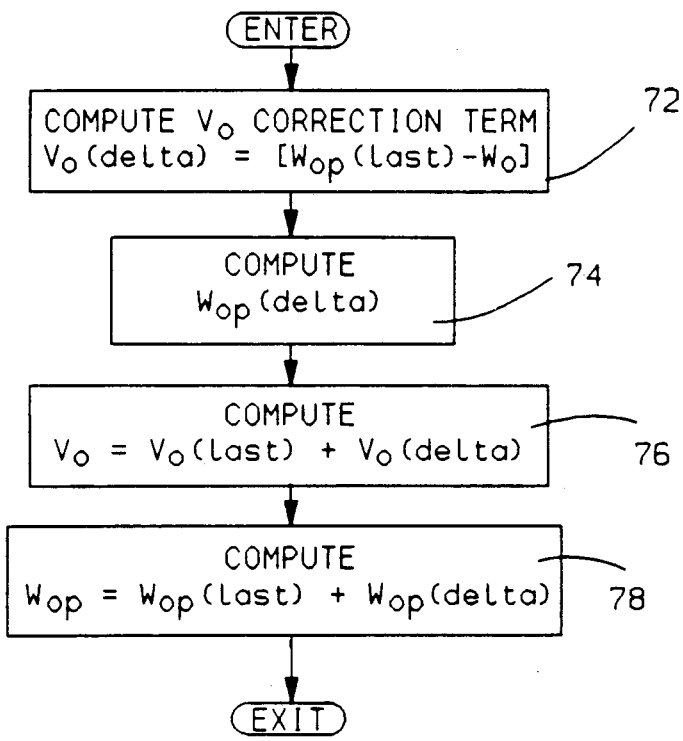
Figure 5:
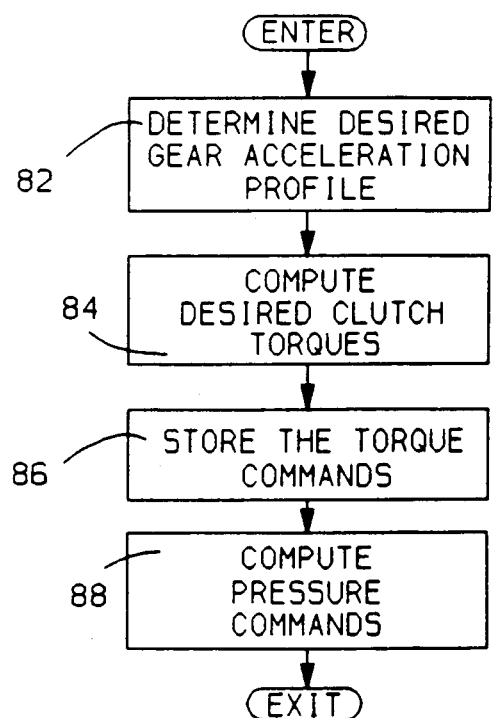

The flow diagram of FIGS. 2–5 represent computer program instructions executed by the controller 34 of FIG. 1 in carrying out the above described control method. Referring to FIG. 2, the reference numeral 50 represents a series of instructions executed at the initiation of each shift for initializing the various terms used in the clutch torque determination routines. Then the block 52 is executed to read the input and output shaft speeds $W_i$ and $W_o$. The blocks 54 and 56 retrieve from the controller memory (1) the clutch torque commands $T_{22}$(last) and $T_{24}$(last), (2) the torque terms $V_i$(last) and $V_o$(last), and (3) the speed projections $W_{ip}$(last) and $W_{op}$(last), all computed in the previous execution of the routine.

At the initiation of a shift, the block 50 initializes the torque commands for the on-coming and off-going clutches to zero and maximum values, respectively. The input and output shaft speed projections $W_{ip}$ and $W_{op}$ are set equal to the respective speed measurements. The estimated torque effect terms $V_i$ and $V_o$ are initialized as set forth in equations (11) and (12) above.

At block 58, the controller 34 computes the speed projection $W_{ip}$ and torque term $V_i$ for the input shaft 18. This step is detailed in the flow diagram of FIG. 3 by blocks 62, 64, 66 and 68. At block 60, the controller 34 computes the speed projection $W_{op}$ and torque term $V_o$ for the output shaft 20. This step is detailed in the flow diagram of FIG. 4 by blocks 72, 74, 76 and 78.

At block 80, the controller 34 determines the new clutch torque commands $T_{22}$ and $T_{24}$. This step is detailed in the flow diagram of FIG. 5 by the blocks 82–88. Block 82 requires a determination of the desired input and output acceleration values $A_i$(des) and $A_o$(des), in accordance with the above-described equations (3) and (4). Then the clutch torque values $T_{22}$ and $T_{24}$ are computed using equations (13) and (14) and stored in the controller memory, as set forth at blocks 84 and 86. Then block 88 is executed to convert the torque commands $T_{22}$ and $T_{24}$ into clutch pressure commands or duty cycles (using the stored clutch gain characteristics) which are applied to the clutches 22 and 24.

While this invention has been described in reference to the illustrated embodiment, it is expected that various modifications will occur to those skilled in the art, as indicated above. In this regard, it should be understood that controls incorporating these and other modifications may fall within the scope of this invention, which is defined by the appended claims.

The embodiments of the invention in which an exclusive property or privilege is claimed are defined as follows:

1. In a power transmission having first and second clutches alternately engageable to define first or second speed ratios between input and output shafts of the transmission, a shift from said first ratio to said second ratio involving concurrent disengagement of said first clutch and engagement of said second clutch, a method of operation comprising the steps of:
    periodically measuring input and output shaft speeds in a series of computation intervals during the shift, and in each such interval;
    estimating input and output shaft torques based on previous torque estimates and the deviation between the measured speed values and predicted speed values from a prior computation interval;
    computing first and second torque commands for said first and second clutches for achieving predetermined input and output shaft acceleration levels based on the estimated input and output shaft torques;
    controlling said first and second clutches to transmit torques in accordance with said first and second torque commands; and predicting input and output shaft speeds for a succeeding computation interval based on previous speed predictions, the first and second torque commands, the estimated input and output shaft torques, and said deviation between the measured speed values and predicted speed values from a prior computation interval.

2. The method of operation of claim 1, wherein:

$W$ is the measured speed value, $W_p(\text{last})$ is the predicted speed value from the preceding computation interval; and the torque estimates and speed predictions are adjusted by a quantities which increase in magnitude relative to the difference $(W_p(\text{last}) - W)$.

3. The method of operation of claim 2, wherein:

the torque estimates are adjusted by the quantity $F(W_p(\text{last}) - W)$ where $F$ is a gain constant;

the speed predictions are adjusted by the quantity $C(W_p(\text{last}) - W)$ where $C$ is a gain constant; and the gain constant $C$ is substantially proportional to $(F^2/4)$.

4. The method of operation of claim 1, wherein:

the desired acceleration values are determined in relation to the difference between the measured and target speeds of a respective shaft.

5. The method of operation of claim 1, wherein:

the torque estimate is initialized to a predetermined value at the onset of said shift corresponding to full engagement of said first clutch and full disengagement of said second clutch.

6. The method of operation of claim 1, wherein:

the predicted speed values in the first computation interval of a shift are initialized to the measured speed values.

* * * * *